(12) United States Patent
Benham et al.

(10) Patent No.: US 11,130,318 B2
(45) Date of Patent: Sep. 28, 2021

(54) PANELS HAVING BARRIER LAYERS AND RELATED METHODS

(71) Applicant: The Boeing Company, Chicago, IL (US)

(72) Inventors: Gary Benham, Marysville, WA (US); Xiaoxi Wang, Mukilteo, WA (US); John Wilde, Mill Creek, WA (US); Jason Drexler, Brier, WA (US)

(73) Assignee: THE BOEING COMPANY, Chicago, IL (US)

( * ) Notice: Subject to any disclaimer, the term of this patent is extended or adjusted under 35 U.S.C. 154(b) by 247 days.

(21) Appl. No.: 15/153,252

(22) Filed: May 12, 2016

(65) Prior Publication Data

US 2017/0326845 A1 Nov. 16, 2017

(51) Int. Cl.
| | |
|---|---|
| *B32B 27/08* | (2006.01) |
| *B32B 5/22* | (2006.01) |
| *B32B 27/06* | (2006.01) |
| *B32B 27/12* | (2006.01) |
| *B32B 27/28* | (2006.01) |
| *B32B 3/12* | (2006.01) |
| *B32B 5/24* | (2006.01) |
| *B32B 5/02* | (2006.01) |
| *B32B 27/30* | (2006.01) |
| *B32B 7/12* | (2006.01) |
| *B32B 27/40* | (2006.01) |
| *B64C 1/12* | (2006.01) |

(52) U.S. Cl.
CPC .............. *B32B 27/08* (2013.01); *B32B 3/12* (2013.01); *B32B 5/02* (2013.01); *B32B 5/022* (2013.01); *B32B 5/22* (2013.01); *B32B 5/24* (2013.01); *B32B 5/245* (2013.01); *B32B 7/12* (2013.01); *B32B 27/065* (2013.01); *B32B 27/12* (2013.01); *B32B 27/281* (2013.01); *B32B 27/304* (2013.01); *B32B 27/40* (2013.01); *B64C 1/12* (2013.01); *B32B 2260/021* (2013.01); *B32B 2260/046* (2013.01); *B32B 2305/024* (2013.01); *B32B 2305/026* (2013.01); *B32B 2307/402* (2013.01); *B32B 2307/7242* (2013.01); *B32B 2307/7246* (2013.01); *B32B 2605/00* (2013.01); *B32B 2605/18* (2013.01)

(58) Field of Classification Search
CPC ....... B32B 27/04; B32B 27/08; B32B 27/302; B32B 27/322; B32B 5/02–022; B32B 5/22–28; B32B 17/04; B32B 19/02; B32B 25/02

See application file for complete search history.

(56) References Cited

U.S. PATENT DOCUMENTS

| | | |
|---|---|---|
| 2,268,477 A | 12/1941 | Elmendort |
| 2,664,833 A | 1/1954 | Armstrong et al. |
| 3,418,189 A | 12/1968 | Grosheim |
| 3,434,411 A | 3/1969 | Allen et al. |
| 4,219,376 A | 8/1980 | Roman |
| 4,238,437 A | 12/1980 | Rolston |
| 4,350,545 A | 9/1982 | Garabedian |
| 4,367,110 A | 1/1983 | Yoshikawa |
| 4,489,119 A | 12/1984 | Ishige et al. |
| 4,504,205 A | 3/1985 | Stofko |
| 4,598,007 A | 7/1986 | Kourtides et al. |
| 4,599,127 A | 7/1986 | Cannady, Jr. et al. |
| 4,693,926 A | 9/1987 | Kowalski et al. |
| 4,803,108 A | 2/1989 | Leuchten et al. |
| 4,855,182 A | 8/1989 | Ondrejas et al. |
| 5,037,350 A | 8/1991 | Richardson et al. |
| 5,085,921 A | 2/1992 | Jayarajan |
| 5,137,775 A | 8/1992 | Davis et al. |
| 5,589,016 A | 12/1996 | Hoopingarner et al. |
| 5,624,728 A | 4/1997 | Hoopingarner et al. |
| 5,698,153 A | 12/1997 | Hoopingarner et al. |
| 5,806,796 A | 9/1998 | Healey |
| 5,976,671 A | 11/1999 | Gleim |
| 6,066,385 A | 5/2000 | Kim |
| 6,251,497 B1 | 6/2001 | Hoopingarner et al. |
| 6,340,413 B1 | 1/2002 | Nilsson et al. |
| 6,419,776 B1 | 7/2002 | Hoopingarner et al. |
| 6,656,567 B1 | 12/2003 | Abe et al. |
| 6,726,971 B1 | 4/2004 | Wong |

(Continued)

FOREIGN PATENT DOCUMENTS

| | | |
|---|---|---|
| CH | 498714 | 11/1970 |
| CN | 202115040 | 1/2012 |

(Continued)

OTHER PUBLICATIONS

European Patent Office, "Extended Search Report," issued in connection with European Patent Application No. 17163791.1, dated Oct. 12, 2017, 11 pages.

(Continued)

*Primary Examiner* — Stephen E Rieth
(74) *Attorney, Agent, or Firm* — Hanley, Flight & Zimmerman, LLC

(57) ABSTRACT

Methods and apparatus to couple a decorative layer to a core layer of a panel via a barrier layer are disclosed. An example apparatus includes a decorative layer coupled to a panel. The panel has a core layer. The example apparatus includes a barrier layer disposed between the core layer and the decorative layer. The barrier layer is to impede at least one of gas or vapor from escaping from the core layer to the decorative layer to deter the at least one of gas or vapor from exerting a pressure on the decorative layer to deter a portion of the decorative layer from separating from the panel.

13 Claims, 9 Drawing Sheets

(56) References Cited

U.S. PATENT DOCUMENTS

| | | | |
|---|---|---|---|
| 7,063,119 | B1 | 6/2006 | Kim |
| 7,289,906 | B2 | 10/2007 | van der Merwe et al. |
| 8,097,108 | B2 | 1/2012 | Wilde et al. |
| 8,715,824 | B2 | 5/2014 | Rawlings et al. |
| 9,031,782 | B1 | 5/2015 | Lemay et al. |
| 10,173,394 | B2 | 1/2019 | Wang et al. |
| 10,647,099 | B2 | 5/2020 | Wang |
| 2002/0084975 | A1 | 7/2002 | Lin |
| 2002/0160680 | A1 | 10/2002 | Laurence et al. |
| 2002/0182957 | A1 | 12/2002 | Levenda |
| 2003/0033779 | A1 | 2/2003 | Downey |
| 2003/0077423 | A1 | 4/2003 | Flanigan et al. |
| 2003/0190458 | A1 | 10/2003 | Spiewak et al. |
| 2003/0219578 | A1 | 11/2003 | Jones et al. |
| 2004/0146696 | A1 | 7/2004 | Jones |
| 2004/0192137 | A1 | 9/2004 | Starkey et al. |
| 2004/0253414 | A1 | 12/2004 | Longobardi |
| 2005/0050782 | A1 | 3/2005 | Ryan et al. |
| 2005/0052516 | A1 | 3/2005 | Wilde et al. |
| 2005/0088014 | A1 | 4/2005 | Woodson et al. |
| 2005/0153023 | A1 | 7/2005 | Overton |
| 2005/0255311 | A1 | 11/2005 | Formella |
| 2006/0089073 | A1 | 4/2006 | Sobieski |
| 2006/0151857 | A1 | 7/2006 | Gasparoni |
| 2006/0234010 | A1 | 10/2006 | Wirrick et al. |
| 2006/0246796 | A1 | 11/2006 | Duffy |
| 2006/0277807 | A1 | 12/2006 | Wilde et al. |
| 2007/0148410 | A1 | 6/2007 | Wimer et al. |
| 2007/0218269 | A1 | 9/2007 | Kato et al. |
| 2008/0087376 | A1 | 4/2008 | Kitchin et al. |
| 2008/0145600 | A1 | 6/2008 | Hendren et al. |
| 2008/0193695 | A1 | 8/2008 | Kato et al. |
| 2008/0237909 | A1 | 10/2008 | Bech |
| 2009/0057947 | A1 | 3/2009 | Nemchick et al. |
| 2010/0043939 | A1 | 2/2010 | Heinimann et al. |
| 2010/0139839 | A1 | 6/2010 | Ridgard et al. |
| 2010/0215907 | A1 | 8/2010 | Spires |
| 2011/0014419 | A1 | 1/2011 | Simmons et al. |
| 2011/0042000 | A1 | 2/2011 | Wilde et al. |
| 2011/0250434 | A1 | 10/2011 | Schauer et al. |
| 2012/0045638 | A1 | 2/2012 | Waldman et al. |
| 2014/0120303 | A1 | 5/2014 | Wilde et al. |
| 2014/0209231 | A1 | 7/2014 | Schappert |
| 2015/0203213 | A1 | 7/2015 | Levien et al. |
| 2016/0047675 | A1 | 2/2016 | Tanenhaus et al. |
| 2016/0089851 | A1 | 3/2016 | Drexler et al. |
| 2016/0250828 | A1 | 9/2016 | Wilde et al. |
| 2017/0326836 | A1 | 11/2017 | Wilde et al. |
| 2017/0326837 | A1 | 11/2017 | Wang et al. |
| 2017/0326845 | A1 | 11/2017 | Benham et al. |
| 2017/0326858 | A1 | 11/2017 | Wang |
| 2017/0326859 | A1 | 11/2017 | Wang et al. |
| 2017/0326863 | A1 | 11/2017 | Wang et al. |
| 2018/0201810 | A1 | 7/2018 | Shido et al. |
| 2020/0086621 | A1 | 3/2020 | Wang et al. |

FOREIGN PATENT DOCUMENTS

| | | |
|---|---|---|
| DE | 19640263 | 4/1998 |
| DE | 102006054586 | 1/2008 |
| EP | 1013414 | 6/2000 |
| EP | 1600288 | 11/2005 |
| EP | 2085212 | 8/2009 |
| EP | 3000593 | 3/2016 |
| EP | 3061601 | 8/2016 |
| GB | 2174033 | 10/1986 |
| GB | 2228214 | 8/1990 |
| GB | 2491190 | 11/2012 |
| JP | 02088331 | 3/1990 |
| JP | 10030287 | 2/1998 |
| JP | 2000265589 | 9/2000 |
| JP | 2002138375 | 5/2002 |
| JP | 2004060061 | 2/2004 |
| JP | 2005075953 | 3/2005 |
| JP | 2005219504 | 8/2005 |
| JP | 2007083721 | 4/2007 |
| JP | 2008037060 | 2/2008 |
| JP | 2009538250 | 11/2009 |
| JP | 2011021094 | 2/2011 |
| JP | 2011206998 | 10/2011 |
| JP | 2017019272 | 1/2017 |
| KR | 20110026567 | 3/2011 |
| WO | 2005037518 | 4/2005 |

OTHER PUBLICATIONS

European Patent Office, "Extended Search Report," issued in connection with European Patent Application No. 17163792.9, dated Oct. 17, 2017, 10 pages.

European Patent Office, "Extended Search Report," issued in connection with European Patent Application No. 17163793.7, dated Oct. 16, 2017, 7 pages.

United States Patent and Trademark Office, "Restriction Requirement," issued in connection with U.S. Appl. No. 15/153,283, dated Jul. 12, 2018, 8 pages.

United States Patent and Trademark Office, "Restriction Requirement," issued in connection with U.S. Appl. No. 15/153,266, dated Jun. 28, 2018, 7 pages.

United States Patent and Trademark Office, "Non-Final Office Action," issued in connection with U.S. Appl. No. 15/153,266, dated Nov. 2, 2018, 21 pages.

United States Patent and Trademark Office, "Non-Final Office Action," issued in connection with U.S. Appl. No. 15/153,283, dated Nov. 9, 2018, 44 pages.

Definition "coil/coiling," Merriam-Webster dictionary, retrieved on Nov. 13, 2018, 5 pages.

United States Patent and Trademark Office, "Final Office Action," issued in connection with U.S. Appl. No. 15/153,283, dated Apr. 29, 2019, 42 pages.

United States Patent and Trademark Office, "Non-Final Office Action," issued in connection with U.S. Appl. No. 15/153,324, dated Mar. 7, 2019, 21 pages.

United States Patent and Trademark Office, "Final Office Action," issued in connection with U.S. Appl. No. 15/153,266, dated May 2, 2019, 46 pages.

European Patent Office, "Extended European Search Report," issued in connection with European Patent Application No. 18202385.3, dated Jan. 24, 2019, 10 pages.

United States Patent and Trademark Office, "Final Office Action," issued in connection with U.S. Appl. No. 15/153,338, dated Jan. 31, 2019, 26 pages.

United States Patent and Trademark Office, "Non-Final Office Action," issued in connection with U.S. Appl. No. 15/153,338, dated Aug. 27, 2018, 38 pages.

United States Patent and Trademark Office, "Requirement for Restriction," issued in connection with U.S. Appl. No. 15/153,338, dated Apr. 30, 2018, 7 pages.

United States Patent and Trademark Office, "Requirement for Restriction," issued in connection with U.S. Appl. No. 15/153,324, dated Mar. 28, 2018, 5 pages.

United States Patent and Trademark Office, "Non-Final Office Action," issued in connection with U.S. Appl. No. 15/153,324, dated Jun. 14, 2018, 42 pages.

United States Patent and Trademark Office, "Final Office Action," issued in connection with U.S. Appl. No. 15/153,324, dated Nov. 20, 2018, 31 pages.

United States Patent and Trademark Office, "Non-Final Office Action," issued in connection with U.S. Appl. No. 15/153,297, dated Mar. 13, 2018, 16 pages.

United States Patent and Trademark Office, "Advisory Action," issued in connection with U.S. Appl. No. 15/153,324, dated Feb. 7, 2019, 5 pages.

United States Patent and Trademark Office, "Notice of Allowance and Fee(s) Due," issued in connection with U.S. Appl. No. 15/153,297, dated Jul. 24, 2018, 27 pages.

3M, "200MP Micro-channel Laminating Adhesives. 467MC, 468MC, 467MCF and 468MCF", accessed at [http://kleylenta.ru/download/lenta/467mc.pdf] on Jun. 1, 2016, 3 pages.

(56) References Cited

OTHER PUBLICATIONS

Weinig, "Weinig Unimat 500: The All-Round Machine for Greater Flexibility in Profiling," retrieved from <https://web.archive.org/web/20160207205725/https://www.weinig.com/en/solid-wood/planing-machines-and-moulders/unimat-series/unimat-500.html> on Sep. 29, 2017, 3 pages.

Zhang et al., "Roll Manufacturing of Polymer Microfluidic Devices Using a Roll Embossing Process," Sensors and Actuators A, 230 (2015), pp. 156-169, 14 pages.

European Patent Office, "Extended European Search Report," issued in connection with European Patent Application No. 17163795.2, dated Oct. 18, 2017, 13 pages.

European Patent Office, "Extended European Search Report," issued in connection with European Patent Application No. 17163795.2, dated Mar. 2, 2018, 14 pages.

European Patent Office, "Extended European Search Report," issued in connection with European Patent Application No. 17163790.3, dated Oct. 17, 2017, 7 pages.

European Patent Office, Communication pursuant to Article 94(3) EPC, issued in connection with European Patent Application No. 17 163 791.1, dated Oct. 16, 2019, 4 pages.

United States Patent and Trademark Office, "Final Office Action," issued in connection with U.S. Appl. No. 15/153,324, dated Aug. 20, 2019, 13 pages.

United States Patent and Trademark Office, "Notice of Allowance," issued in connection with U.S. Appl. No. 15/592,001 dated Sep. 27, 2019, 7 pages.

European Patent Office, Communication pursuant to Article 94(3) EPC, issued in connection with European Patent Application No. 18 202 385.3, dated Oct. 11, 2019, 4 pages.

United States Patent and Trademark Office, "Notice of Allowance," issued in connection with U.S. Appl. No. 15/153,283 dated Aug. 19, 2019, 14 pages.

United States Patent and Trademark Office, "Final Office Action," issued in connection with U.S. Appl. No. 15/153,266, dated Aug. 1, 2019, 23 pages.

European Patent Office, "Extended European Search Report," issued in connection with European Patent Application No. 1919688039, dated Dec. 3, 2019, 7 pages.

European Patent Office, "Communication pursuant to Article 94(3)," issued in connection with European Patent Application No. 17163792.9, dated Nov. 14, 2019, 7 pages.

United States Patent and Trademark Office, "Notice of Allowance and Fee(s) Due," issued in connection with U.S. Appl. No. 15/153,324, dated Dec. 31, 2019, 13 pages.

United States Patent and Trademark Office, "Notice of Allowance and Fee(s) Due," issued in connection with U.S. Appl. No. 15/153,266, dated Dec. 31, 2019, 14 pages.

United States Patent and Trademark Office, "Notice of Allowance and Fee(s) Due," dated Apr. 13, 2020, issued in connection with U.S. Appl. No. 15/153,338, 10 pages.

European Patent Office, "Communication pursuant to Article 94(3) EPC," issued on connection with European Patent Application No. 18 202 385.3, dated Mar. 25, 2020, 6 pages.

Japan Patent Office, "Notice of Reasons for Rejection" issued in connection with Japanese Patent Application No. 2017-087224, dated Mar. 2, 2021, 6 pages.

Japan Patent Office, "Notice of Reasons for Rejection" issued in connection with Japanese Patent Application No. 2017-087233, dated Feb. 24, 2021, 10 pages.

European Patent Office, "Extended European Search Report," issued in connection with European Patent Application No. 20173192.4, dated Aug. 20, 2020, 10 pages.

European Patent Office, "Communication pursuant to Article 94(3) EPC," issued in connection with European Patent Application No. 17 163 792.9, dated Aug. 17, 2020, 7 pages.

United States Patent and Trademark Office, "Non-Final Office Action," issued in connection with U.S. Appl. No. 16/837,498, dated Jul. 9, 2020, 14 pages.

United States Patent and Trademark Office, "Notice of Allowance and Fee(s) Due," issued in connection with U.S. Appl. No. 16/837,498, dated Nov. 4, 2020, 8 pages.

Japan Patent Office, "Notice of Reasons for Rejection" issued in connection with Japanese Patent Application No. 2017-087245, dated Mar. 30, 2021, 6 pages.

PANELS HAVING BARRIER LAYERS AND RELATED METHODS

CROSS-REFERENCE TO RELATED APPLICATIONS

This patent relates to subject matter disclosed in U.S. patent application Ser. No. 15/153,266 entitled "Methods and Apparatus to Couple a Decorative Layer to a Panel via a High-Bond Adhesive Layer", U.S. patent application Ser. No. 15/153,283 entitled "Methods and Apparatus to Couple a Decorative Composite Having a Reinforcing Layer to a Panel", U.S. patent application Ser. No. 15/153,297 entitled "Methods and Apparatus to Vent Gas and Vapor from a Panel via Venting Channels for a Decorative Layer", U.S. patent application Ser. No. 15/153,324 entitled "Methods and Apparatus to Form Venting Channels on a Panel for a Decorative Layer", U.S. patent application Ser. No. 15/153,338 entitled "Methods and Apparatus to Remove Gas and Vapor from a Panel for a Decorative Layer", all of which were filed on May 12, 2016 and are incorporated herein by reference in their entireties.

FIELD OF THE DISCLOSURE

This patent relates generally to decorative layers and, more particularly, to methods and apparatus to couple a decorative layer to a core layer of a panel via a barrier layer.

BACKGROUND

Vehicles (e.g., aircraft, buses, trains, tractor-trailers, ships, etc.), buildings and/or other structures (e.g., billboards) include surfaces that are visible to the public. Oftentimes, these surfaces include decorative images for aesthetic, identification and/or advertising purposes. For example, some surfaces of aircraft include decorative images that identify an airline carrier associated with the aircraft. In some instances, the decorative images are formed on a decorative laminate that is coupled to the surface of the vehicle, building and/or other structure. A pocket of gas and/or vapor (e.g., water vapor) may form between the decorative laminate and the surface, thereby causing an adjacent portion of the decorative laminate to bubble.

SUMMARY

In one example, an apparatus includes a decorative layer coupled to a panel. The panel has a core layer. The example apparatus includes a barrier layer disposed between the core layer and the decorative layer. The barrier layer is to impede at least one of gas or vapor from escaping from the core layer to the decorative layer to deter the at least one of gas or vapor from exerting a pressure on the decorative layer to deter a portion of the decorative layer from separating from the panel.

In another example, an apparatus includes means for decorating a panel. The panel has means for providing structure. The example apparatus includes means for impeding gas and vapor flow disposed between the means for decorating and the means for providing structure. The means for impeding gas and vapor flow to impede at least one of gas or vapor from escaping from the means for providing structure to the means for decorating to deter the at least one of gas or vapor from exerting a pressure on the means for decorating to deter a portion of the means for decorating from separating from the panel.

In another example, a method includes coupling a barrier layer to a core layer of a panel and coupling a decorative layer to the barrier layer that is coupled to the core layer. The barrier layer is to impede at least one of gas or vapor from escaping from the core layer to the decorative layer to deter the at least one of gas or vapor from exerting a pressure on the decorative layer to deter a portion of the decorative layer from separating from the panel.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1:
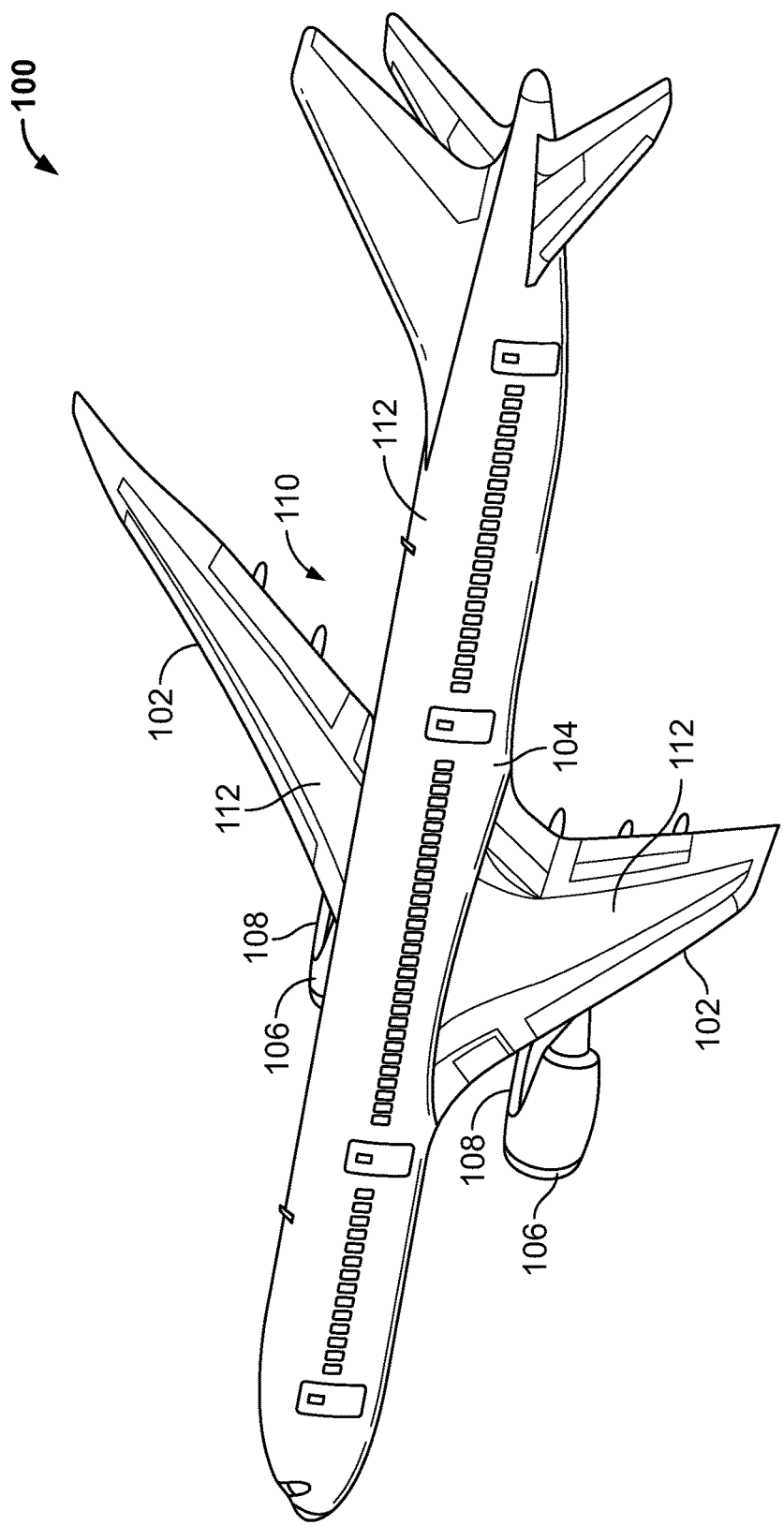
FIG. 1 depicts an example aircraft in accordance with the teachings herein.

Surfaces in public spaces (e.g., billboards, building walls, vehicle panels, etc.) oftentimes include decorative images for aesthetic, informational, and/or advertising purposes. For example, known aircraft and/or other vehicles (e.g., buses, trains, tractor-trailers, ships, etc.) often include decorative images on their surfaces for identification and/or advertising purposes. In some examples, the visible surfaces of aircraft interiors include decorative images that identify respective airline carriers associated with the aircraft.

Some known decorative images are formed on a decorative layer (e.g., a decorative laminate) that is coupled to a corresponding surface. For example, decorative layers are coupled to panels of aircraft via an adhesive layer. In some instances, a portion of the decorative layer or laminate may separate from the surface to which it is coupled. For example, a pocket of gas and/or vapor (e.g., water vapor) may form between the decorative laminate and the surface, thereby causing an adjacent portion of the decorative laminate to bubble. Such separation between the decorative laminate and the surface may be undesirable for aesthetic purposes (e.g., bubbling of the decorative laminate may be aesthetically unappealing) and/or may cause the decorative laminate to become damaged and/or to further separate (e.g., delaminate) from the surface over time.

In some instances, pockets of gas and/or vapor are entrapped between a decorative laminate and a surface of a panel (e.g., an interior surface in a compartment of the aircraft such as a surface of a bin, a lining, furnishings, etc.) when the decorative laminate is initially coupled to the surface. That is, the separation results from the decorative laminate not being laid flush with the surface when the decorative laminate is initially coupled to the surface.

In other instances, the pockets of gas and/or vapor that cause separation between the decorative laminate and the surface form as a result of the gas and/or vapor escaping from material of the panel and becoming trapped (e.g., to form a bubble) between the decorative laminate and the panel. When a decorative laminate is coupled to a panel of an aircraft, gas and/or vapor (e.g., water vapor) may be emitted from a core layer (e.g., a honeycomb core, a foam core, etc.) of the panel and subsequently become trapped between the decorative laminate and the surface of the panel. For example, the gas and/or vapor may escape and/or be emitted from the core layer of the panel when there is difference in pressure and/or temperature between the core layer of the panel and the environment exterior to the panel. For example, the gas and/or vapor may migrate from the core layer toward the decorative laminate when pressure closer to the core layer is greater than pressure closer to the decorative laminate. The gas and/or vapor becomes trapped between the decorative laminate as a result of the decorative laminate being composed of substantially impermeable and/or nonporous material that deters and/or impedes the gas and/or vapor of the core layer from traversing therethrough. The trapped gas and/or vapor creates an internal pressure between the decorative laminate and the panel that applies a concentrated force to the decorative laminate and/or the surface, thereby causing the decorative laminate to separate from the surface of the panel (e.g., from the interior surface in the aircraft compartment, etc.). Additionally or alternatively, the gas and/or vapor that is trapped between the decorative laminate and the panel may originate from an interaction (e.g., a chemical reaction, a physical reaction, etc.) between components of the panel and/or the decorative laminate such as between the core layer and a reinforcing layer of the panel, between the reinforcing layer and an adhesive coupled to the decorative laminate, etc.

To deter and/or impede gas and/or vapor from causing a portion of a decorative layer coupled to a panel from separating from the panel, the example methods and apparatus disclosed herein include a barrier layer disposed between a core layer (e.g., a honeycomb core, a foam core, and/or a combination thereof) of the panel and the decorative layer that deters and/or impedes gas and/or vapor from escaping from the core layer to the decorative layer. For example, the barrier layer is composed of a substantially nonporous and/or impermeable plastic film such as polyvinyl fluoride (e.g., Tedlar®) that deters and/or impedes gas and/or vapor from traversing through the barrier layer. Because the barrier layer of the examples disclosed herein is disposed between the core layer and the decorative layer, the barrier layer deters and/or impedes gas and/or vapor emitted from the core layer from reaching the decorative layer and creating an internal pressure between the decorative layer and a surface of the panel. Thus, the barrier layer deters and/or impedes the gas and/or vapor from exerting a pressure and/or a force on a portion of the decorative layer to deter and/or impede the decorative layer from separating from the panel (e.g., to deter and/or impede the decorative layer from bubbling).

The barrier layer of the examples disclosed herein is coupled to the surface (e.g., a first surface) of the panel. In some examples, the barrier layer is swept and/or sanded during its manufacture to smooth and/or remove any imperfections from a surface (e.g., a second surface) of the barrier layer to enable the decorative layer to lie flush with the barrier layer to further deter and/or impede separation between the decorative layer and the panel. Further, a sealing layer (e.g., a gas deposit and/or a liquid, paste and/or solid layer of resin) may be applied to a portion of the surface of the barrier layer to cover any visual imperfections that result from the sweeping and/or sanding of the barrier layer.

In some examples, the barrier layer is disposed between the core layer and an outer layer of the panel. Because the barrier layer is disposed between the core layer and the outer layer of the panel, the barrier layer is disposed between the core layer and the decorative layer coupled to the panel and, thus, deters and/or impedes gas and/or vapor emitted from the core layer from exerting a pressure and/or a force that separates a portion of the decorative layer from the panel. In some such examples, the panel includes the core layer, a reinforcing layer (e.g., a first reinforcing layer), the barrier layer, and another reinforcing layer (e.g., a second reinforcing layer). For example, the first reinforcing layer is coupled to the core layer, the barrier layer is coupled to the first reinforcing layer that is coupled to the core layer, and the second reinforcing layer is coupled to the barrier layer that is coupled to the first reinforcing layer. The first and second barrier layers each include a fiber reinforcing layer and a resin layer that couple the fiber reinforcing layer to an adjacent surface. In some examples, the first and second barrier layers are pre-impregnated layers in which the fiber reinforcing layer is pre-impregnated with the resin layer (e.g., the resin layer is partially cured but not hardened to enable the resin to couple the fiber reinforcing layer to the adjacent surface when cured).

In other examples in which the barrier layer is disposed between the core layer and the outer layer of the panel, the panel includes the core layer and a reinforcing layer (e.g., a first reinforcing layer) that includes the barrier layer. In such examples, the reinforcing layer includes the barrier layer, a fiber reinforcing layer, and resin layers. A first resin layer of the barrier layer is to couple to the core layer of the panel, the fiber reinforcing layer is coupled to the first resin layer that is to couple to the core layer, a second resin layer is coupled to the fiber reinforcing layer that is coupled to the first resin layer, and the barrier layer is coupled to the second resin layer that is coupled to the fiber reinforcing layer. Further, some example panels include another reinforcing layer (e.g., a second reinforcing layer that is substantially similar or identical to the first reinforcing layer) coupled to the first reinforcing layer that is coupled to the core layer. The second reinforcing layer further deters and/or impedes gas and/or vapor emitted from the core layer from causing a portion of the decorative layer from separating from the panel.

As used herein, the terms "couple," "coupled," and "coupling" refer to a direct or indirect attachment of one object to another object (e.g., one layer to another layer). For example, a first object is directly attached and, thus, coupled to a second object if a surface of the first object contacts a surface of the second object without any other object disposed therebetween. A first object is indirectly attached and, thus, coupled to a second object if the first object does not directly contact the second object but, instead, is fixed to the second object via intermediate object(s) (e.g., layer(s)) that are positioned between the first and second objects.

Turning to the figures, FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. A compartment 110 (e.g., a cargo compartment, a passenger compartment, a flight deck, etc.) is disposed within the fuselage 104 of the illustrated example. The wings 102 and the fuselage 104 define an outer surface 112 of the aircraft 100.

Figure 2A:
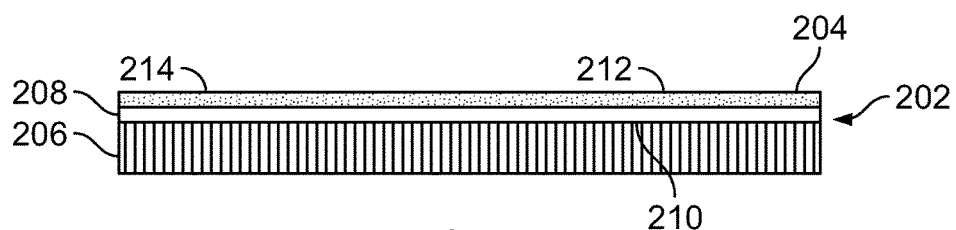
FIG. 2A is a cross-sectional view of a known decorative layer and a portion of a known panel.
Figure 2B:
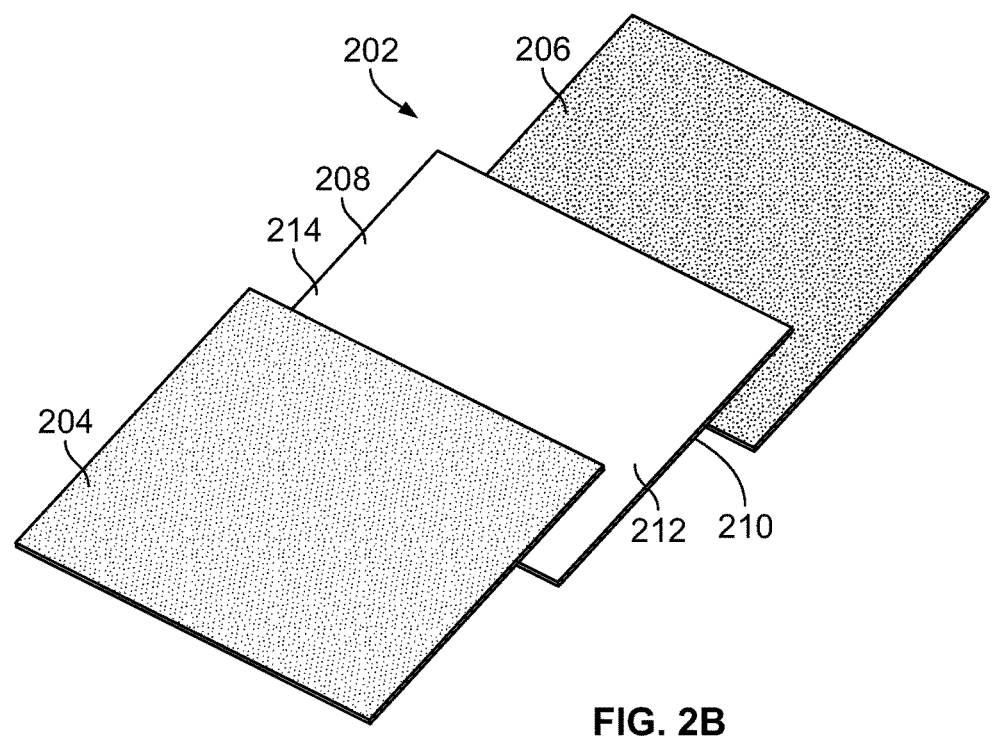
FIG. 2B is an exploded view of the known decorative layer and the portion of the known panel of FIG. 2A.

Before discussing the example decorative layers and the example panels disclosed herein, a brief description of a known panel 202 and a known decorative layer 204 is provided in connection with FIGS. 2A and 2B. More specifically, FIG. 2A is a cross-sectional view of the known decorative layer 204 and a portion of the known panel 202, and FIG. 2B is an exploded view of the known decorative layer 204 and the portion of the known panel 202.

As illustrated in FIGS. 2A and 2B, the known panel 202 includes a core layer 206 and a reinforcing layer 208 coupled to the core layer 206. A first surface 210 of the reinforcing layer 208 engages the core layer 206, and an opposing second surface 212 defines a surface 214 of the panel 202. The reinforcing layer 208 of the known panel 202 may be composed of materials that are partially porous and/or permeable (e.g., resin, reinforcing fiber, etc.) such that some gas and/or vapor (e.g., water vapor) may traverse through the reinforcing layer 208. Further, while not shown in the portion of the known panel 202 illustrated in FIGS. 2A and 2B, another reinforcing layer engages another surface of the core layer 206 opposite the reinforcing layer 208 such that a sandwich-structured composite is formed by the reinforcing layer 208, the core layer 206, and the other opposing reinforcing layer.

Further, the known decorative layer 204 includes decorative features (e.g., colors, patterns, logos, text, etc.) that are to be displayed on the known panel 202. As illustrated in FIG. 2A, the decorative layer 204 is coupled to the surface 214 of the panel 202 to enable the decorative features of the decorative layer 204 to be displayed on the panel 202. For example, the decorative layer 204 is adhesively coupled to the second surface 212 of the reinforcing layer 208.

In some instances, gas and/or vapor (e.g., water vapor) is trapped within the core layer 206 of the panel 202 (e.g., trapped between the reinforcing layer 208 and the opposing reinforcing layer of a sandwich-structured composite of the panel 202). When a difference in pressure and/or temperature between the core layer 206 and the environment exterior to the panel 202 occurs (e.g., when pressure closer to the core layer 206 is greater than pressure closer to the decorative layer 204), the gas and/or vapor escape and/or are emitted from the core layer 206 of the panel 202. In other instances, gas and/or vapor of the panel 202 may originate from an interaction (e.g., a chemical reaction, a physical reaction, etc.) between material of the core layer 206 (e.g., a honeycomb core, a foam core, resin, reinforcing fiber, etc.) and/or the decorative layer 204 (e.g., a decorative laminate, an adhesive layer, etc.).

Because the decorative layer 204 coupled to the panel 202 is composed of substantially impermeable and/or nonporous material, the vapor and/or gas that is emitted from the core layer 206 traverses through the reinforcing layer 208 and becomes trapped between the decorative layer 204 and the surface 214 of the panel 202. The trapped vapor and/or gas create an internal pressure that applies a concentrated force to an adjacent portion of the decorative layer 204 and/or the surface 214 of the panel 202. For example, the applied force pushes a portion of the decorative layer 204 away from the surface 214 of the panel 202, thereby causing the portion of the decorative layer 204 to separate from the panel 202. In other words, vapor and/or gas of the known panel 202 may form bubbles in the known decorative layer 204 that are aesthetically unappealing and/or which damage the decorative layer 204.

The example apparatus disclosed in FIGS. 3A-5B include a barrier layer disposed between a core layer (e.g., a honeycomb core, a foam core, and/or a combination thereof) of a panel and a decorative layer. For example, the barrier layer is composed of a substantially nonporous and/or impermeable film that deters and/or impedes gas and/or vapor from traversing through the barrier layer. Because the barrier layer of the examples disclosed herein is disposed between the core layer and the decorative layer, the barrier layer deters and/or impedes gas and/or vapor emitted from the core layer from reaching the decorative layer and creating an internal pressure between the decorative layer and a surface of the panel. Thus, the barrier layer deters and/or impedes the gas and/or vapor from exerting a pressure and/or a force on a portion of the decorative layer to deter and/or impede bubbling of the decorative layer.

Figure 3A:
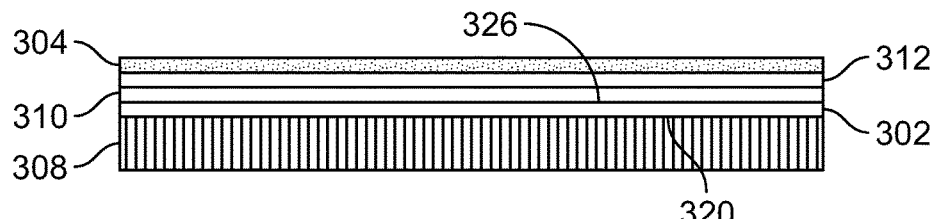
FIG. 3A is a cross-sectional view of an example barrier layer disposed between an example decorative layer and an example panel in accordance with the teachings herein.
Figure 3B:
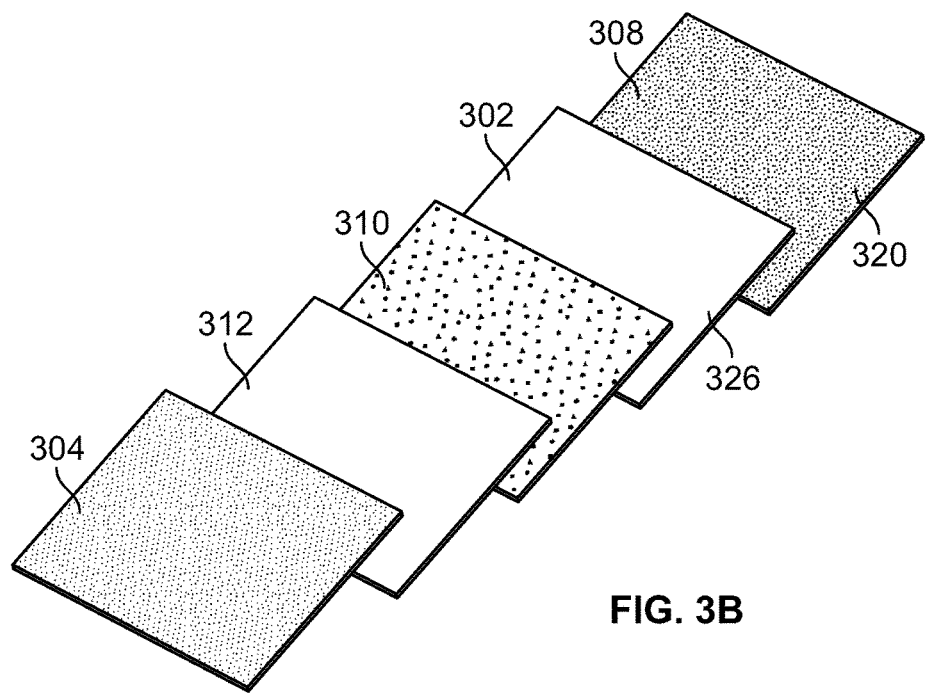
FIG. 3B is an exploded view of the example barrier layer, the example decorative layer, and the example panel of FIG. 3A.
Figure 3C:
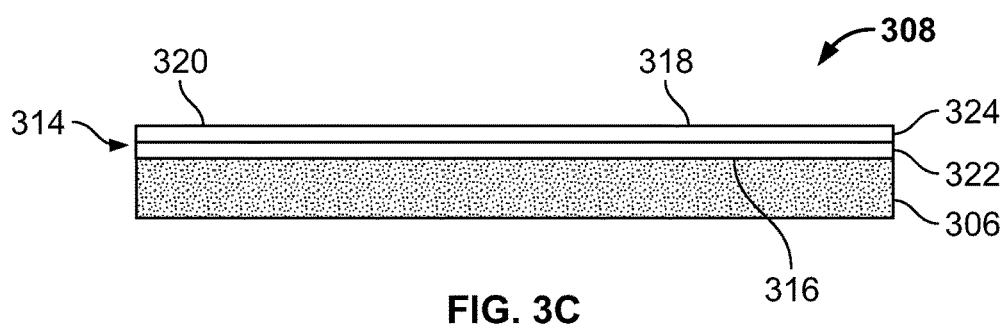
FIG. 3C is a cross-sectional view of a portion of the example panel of FIGS. 3A and 3B.

FIGS. 3A-3C illustrate an example barrier layer 302 disposed between an example decorative layer 304 and a core layer 306 of an example panel 308 in accordance with the teachings herein. More specifically, FIG. 3A is a cross-sectional view and FIG. 3B is an exploded view of the panel 308, the barrier layer 302, a sealing layer 310, an adhesive layer 312, and the decorative layer 304. Further, FIG. 3C is a cross-sectional view of a portion of the panel 308. As described in further detail below, the barrier layer 302 deters and/or impedes gas and/or vapor (e.g., water vapor) from causing a portion of the decorative layer 304 to separate from the panel 308.

As illustrated in FIG. 3C, the example panel 308 includes the core layer 306 and a reinforcing layer 314. A first surface 316 of the reinforcing layer 314 is coupled to the core layer 306, and an opposing second surface 318 of the reinforcing layer 314 defines a surface 320 of the panel 308 to which the decorative layer 304 is to couple. While FIG. 3C shows a reinforcing layer (e.g., the reinforcing layer 314) coupled to one side of the core layer 306, another reinforcing layer (e.g., substantially similar or identical to the reinforcing layer 314) not shown in FIG. 3C is coupled to another surface of the core layer 306 opposite the reinforcing layer 314 such that the panel 308 is a sandwich-structured composite formed by the reinforcing layer 314, the core layer 306, and the other opposing reinforcing layer. In such examples, the opposing reinforcing layers (e.g., the reinforcing layer 314 and the other reinforcing layer) trap gas and/or vapor in the core layer 306 of the sandwich-structured panel 308. Further, the panel 308 forms a surface of a wall (e.g., a billboard, a building wall, etc.) and/or a vehicle (e.g., buses, trains, tractor-trailers, ships, etc.) such as the outer surface 112 of the aircraft 100 of FIG. 1 and/or a surface of a bin (e.g., a stow-bin), a lining (e.g., of a sidewall, a ceiling, etc.), furnishings (e.g., a monument, a closet, a crew-rest, a lavatory, etc.) located in the compartment 110 of the aircraft 100 of FIG. 1, etc.

The core layer 306 is composed of, for example, a honeycomb core, a foam core and/or a combination thereof. In some such examples, the core layer 306 includes a honeycomb core and foam core. The core layer 306 is composed of lightweight material(s) and the structure of the core layer 306 (e.g., the honeycomb pattern) provides flexural strength (e.g., bending stiffness) to the panel 308. Thus, the core layer 306 of the illustrated example provides flexural strength to the panel 308 without adding a significant amount of weight to the panel 308 and, thus, to the structure (e.g., the aircraft 100) of which the panel 308 forms a surface.

As illustrated in FIG. 3C, the reinforcing layer 314 of the panel 308 includes a fiber reinforcing layer 322 and a resin layer 324. In the illustrated example, the fiber reinforcing 322 is positioned between the resin layer 324 and the core layer 306. In other examples, the resin layer 324 may be positioned between the fiber reinforcing layer 322 and the core layer 306. Additionally or alternatively, the reinforcing layer 314 may include a plurality of fiber reinforcing layers and/or a plurality of resin layers. Further, the panel 308 may include a plurality of reinforcing layers that each include a fiber reinforcing layer (e.g., the fiber reinforcing layer 322) and a resin layer (e.g., the resin layer 324).

The fiber reinforcing layer 322 is composed of, for example, fiberglass, graphite-cloth, synthetic fiber (e.g., Aramid fiber), natural fiber, (e.g., wood, flax, cellulose, jute, hemp, straw, switch grass, kenaf, cotton, coir, bamboo, etc.), a combination thereof and/or any other material that reinforces the core layer 306 by providing compression strength to the panel 308. The resin layer 324 bonds the fiber reinforcing layer 322 to the core layer 306 to form the panel 308. In some examples, the reinforcing layer 314 is a pre-impregnated layer (i.e., prepreg) in which the fiber reinforcing layer 322 is pre-impregnated with resin (e.g., resin of the resin layer 324). The pre-impregnated resin is partially cured but not yet hardened to enable the resin to bond to adjacent surfaces (e.g., the fiber reinforcing layer 322 and the core layer 306) upon being more fully cured (e.g., via heat). Thus, in examples in which the reinforcing layer 314 is a pre-impregnated layer, the pre-impregnated resin of the resin layer 324 is cured to couple the fiber reinforcing layer 322 to the core layer 306 to form the panel 308.

Returning to FIGS. 3A and 3B, the example barrier layer 302 is coupled to the surface 320 of the panel 308, and the sealing layer 310 is applied to portion(s) of a surface 326 of the barrier layer 302 that is coupled to the panel 308. Further, the decorative layer 304 is coupled, via the adhesive layer 312, to the sealing layer 310 and/or to portion(s) of the surface 326 of the barrier layer 302 that is coupled to the panel 308.

The barrier layer 302 of the illustrated example is composed of a substantially impermeable and/or non-porous material (e.g., a plastic material) that deters and/or impedes gas and/or vapor from traversing therethrough. For example, the barrier layer 302 is a film of polyvinyl fluoride (e.g., Tedlar®) having a thickness of about 0.002 inches (0.051 millimeters) that deters and/or impedes gas and/or vapor (e.g., water vapor) from passing through barrier layer 302. Additionally or alternatively, the barrier layer 302 may be composed of a solid layer of resin material (e.g., an epoxy resin, a urethane resin, an acrylic resin, etc.) and/or a gas deposit, a liquid, and/or a paste of resin material that is subsequently hardened. The surface 326 of the barrier layer 302 may be swept, sanded and/or otherwise treated to smooth the surface 326 of the barrier layer 302. The surface 326 is smoothened to enable the decorative layer 304 to lie flush with the barrier layer 302 to deter and/or impede a portion of the decorative layer 304 from being separated from the barrier layer 302 that is coupled to the panel 308.

In some instances, the sweeping and/or sanding of the barrier layer 302 results in aesthetic features that create undesirable aesthetic features of the finished decorative layer 304. To cover those undesirable aesthetic features, prior to finishing the decorative panel, the sealing layer 310 of the illustrated example is applied to portion(s) of the surface 326 of the barrier layer 302 where those features are located. That is, the sealing layer 310 may not necessarily be applied to the entire surface 326 of the barrier layer 302, but is applied only to those portions at which aesthetic features of the barrier layer 302 are to be covered. Further, the sealing layer 310 is composed of a gas deposit and/or a liquid, paste and/or sold layer of resin material such as an epoxy resin, a urethane resin, an acrylic resin, etc. that can be applied to cover and/or mask aesthetic features of the barrier layer 302 without affecting the coupling between the decorative layer 304 and the barrier layer 302.

In the illustrated example, the decorative layer 304 is coupled to the sealing layer 310 and/or the barrier layer 302 via the adhesive layer 312. For example, the adhesive layer 312 is fixed to the decorative layer 304 and engages the barrier layer 302 to couple the decorative layer 304 to the barrier layer 302. Alternatively, the adhesive layer 312 is fixed to the surface 326 of the barrier layer 302 and/or the sealing layer 310, and the decorative layer 304 engages the adhesive layer 312 to couple to the barrier layer 302.

The adhesive layer 312 is composed of, for example, a pressure-sensitive adhesive (e.g., an acrylic pressure-sensitive adhesive) that enables the decorative layer 304 to be quickly and securely coupled to the barrier layer 302. In some examples, a primer and/or sealer is applied to further enable the decorative layer 304 to be securely coupled to the barrier layer 302. In the illustrated example, the adhesive layer 312 has a thickness of about between 0.001 inches (0.025 millimeters) and 0.1 inches (2.54 millimeters). Additionally or alternatively, the adhesive layer 312 may include a flame-retardant additive that enables the adhesive layer 312 to provide flame-penetration resistance to the panel 308 to which it is coupled (e.g., the outer surface 112 and/or a surface in the compartment 110 of the aircraft 100).

The decorative layer 304 is composed of, for example, a laminate that includes decorative features (e.g., colors, patterns, logos, text, etc.). The decorative layer 304 is coupled to the panel 308 to enable the decorative features of the decorative layer 304 to be displayed on a surface (e.g., on the outer surface 112 and/or a surface in the compartment 110 of the aircraft 100) formed by the panel 308. For example, the decorative layer 304 is coupled to the outer surface 112 of the aircraft 100 to identify and/or advertise an airline carrier associated with the aircraft 100. In some examples, the decorative layer 304 includes a flame-retardant additive that enables the decorative layer 304 to provide flame-penetration resistance to the panel 308 to which it is coupled (e.g., to the outer surface 112 of the aircraft 100).

As illustrated in the example of FIGS. 3A and 3B, the decorative layer 304 is coupled to the panel 308 via the barrier layer 302 so that the barrier layer 302 is disposed between the decorative layer 304 and the panel 308. Because the barrier layer 302 is composed of substantially impermeable material, the barrier layer 302 deters and/or impedes gas and/or vapor (e.g., water vapor) that originates in the core layer 306 (e.g., that is initially trapped in the core layer 306 between the reinforcing layer 314 and the opposing reinforcing layer of the sandwich-structured panel 308) from escaping the panel 308 to the decorative layer 304 and, thus, deters and/or impedes a portion of the decorative layer 304 from separating from the panel 308 (e.g., the barrier layer 302 deters and/or impedes the decorative layer 304 from bubbling).

Figure 4A:
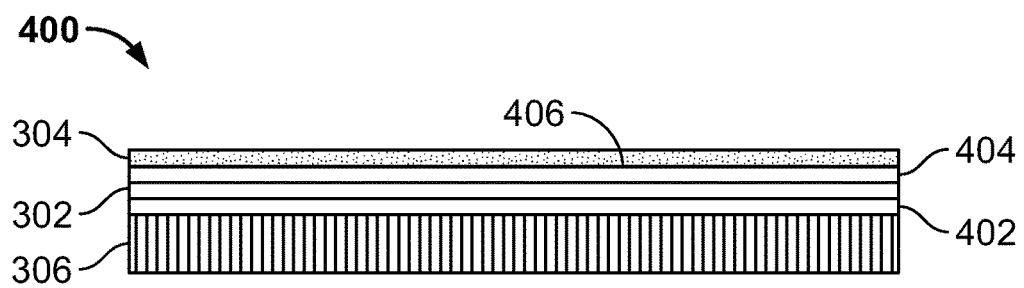
FIG. 4A is a cross-sectional view of an example barrier layer of a portion of another example panel in accordance with the teachings herein.
Figure 4B:
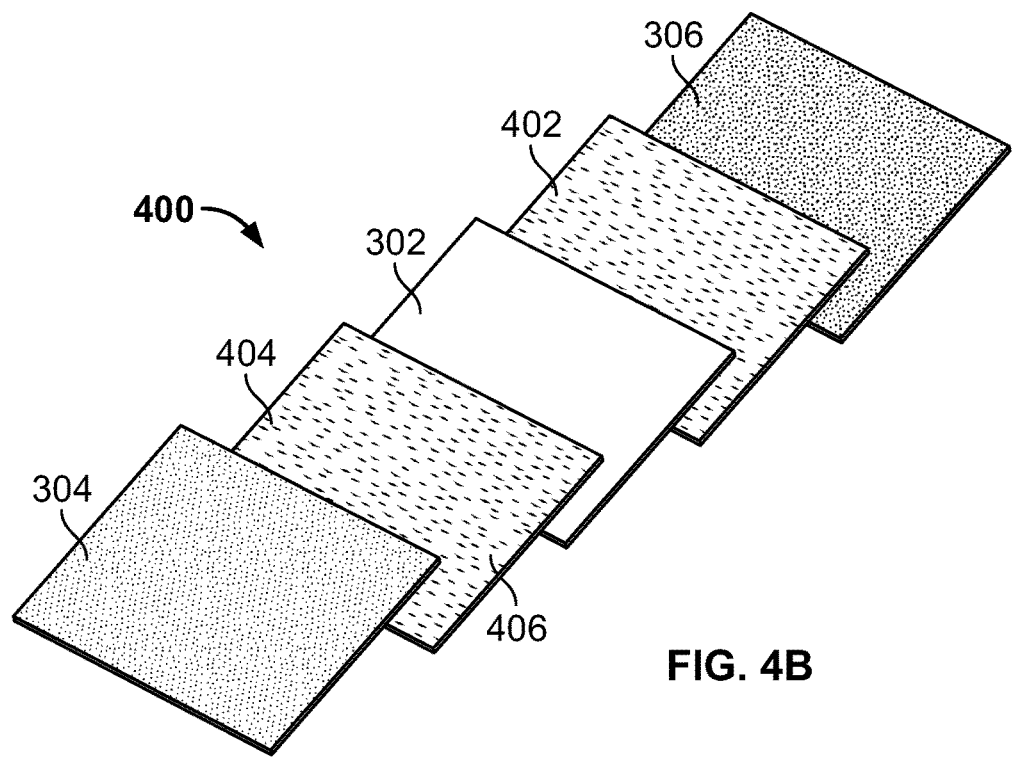
FIG. 4B is an exploded view of the portion of the example panel of FIG. 4A.

FIGS. 4A and 4B illustrate another example panel 400 that includes the example barrier layer 302 coupled to the core layer 306 in accordance with the teachings herein. More specifically, FIG. 4A is a cross-sectional view of a portion of the example panel 400, and FIG. 4B is an exploded view of the portion of the example panel 400.

The barrier layer 302, the decorative layer 304, and the core layer 306 of FIGS. 4A and 4B are substantially similar or identical to those components having the same reference numbers in FIGS. 3A-3C. Further, reinforcing layers 402, 404 of the panel 400 of FIGS. 4A and 4B are substantially similar or identical to the reinforcing layer 314 of FIG. 3C. Because the reinforcing layer 314 is described in detail in connection with FIG. 3C, some characteristics of the reinforcing layers 402, 404 of FIGS. 4A and 4B are not described in further detail below.

The example panel 400 includes the barrier layer 302, the core layer 306, and the reinforcing layer 402, 404. That is, the barrier layer 302 is not coupled to the panel 400 but, instead, is part of the panel 400 itself. For example, to form the panel 400, the reinforcing layer 402 (e.g., a first reinforcing layer) is coupled to the core layer 306 of the panel 308, and the barrier layer 302 is coupled to the reinforcing layer 402 that is coupled to the core layer 306. The reinforcing layer 404 (e.g., a second reinforcing layer) is coupled to the barrier layer 302 and defines a surface 406 of the panel 400. While FIGS. 4A and 4B show the panel 400 having a reinforcing layer (e.g., the reinforcing layer 402) coupled to one side of the panel 400, the panel 400 includes another reinforcing layer (e.g., substantially similar or identical to the reinforcing layer 402) coupled to the opposing side of the core layer 306 such that the panel 400 is a sandwich-structured composite formed by the reinforcing layer 402, the core layer 306, and the other opposing reinforcing layer. In such examples, the opposing reinforcing layers traps gas and/or vapor in the core layer 306 of the panel 400. Further, a plurality of reinforcing layers (e.g., reinforcing layers substantially similar or identical to the reinforcing layer 402) and/or fiber reinforcing layers (e.g., fiber reinforcing layers substantially similar or identical to the fiber reinforcing layer 322 of FIG. 3) of a reinforcing layer may be disposed between the barrier layer 302 and the core layer 306 to further deter and/or impede gas and/or vapor from being emitted to the decorative layer 304. Additionally or alternatively, a plurality of reinforcing layers (e.g., reinforcing layers substantially similar or identical to the reinforcing layer 404) and/or fiber reinforcing layers (e.g., fiber reinforcing layers substantially similar or identical to the fiber reinforcing layer 322 of FIG. 3) of a reinforcing layer may be disposed between the barrier layer 302 and the decorative layer 304.

In the illustrated example, the decorative layer 304 is coupled to the surface 406 of the panel 400 and, thus, is coupled to the core layer 306 via the barrier layer 302 and the reinforcing layers 402, 404 of the panel 400. In other examples, another barrier layer (e.g., a second barrier layer substantially similar or identical to the barrier layer 302) is coupled to the reinforcing layer 404, and another reinforcing layer (e.g., a third reinforcing layer substantially similar or identical to the reinforcing layers 402, 404) is coupled to the second barrier layer that is coupled to the reinforcing layer 404. In such examples, the decorative layer 304 is coupled to a surface of the third reinforcing layer to couple to the core layer 306 of the panel 400.

As illustrated in the example of FIGS. 4A and 4B, the barrier layer 302 is disposed between the core layer 306 and the surface 406 of the panel 400 so that the barrier layer 302 is positioned between the decorative layer 304 and the core layer 306 when the decorative layer 304 is coupled to the panel 400. Because the barrier layer 302 is composed of substantially impermeable material, the barrier layer 302 deters and/or impedes gas and/or vapor that originates from the core layer 306 (e.g., that is initially trapped in the core layer 306 between the reinforcing layer 402 and an opposing reinforcing layer of the sandwich-structured panel 400) from reaching the decorative layer 304. Thus, the barrier layer 302 of the example panel 400 deters and/or impedes a portion of the decorative layer 304 from separating from the surface 406 of the panel 400 (i.e., the barrier layer 302 of the panel 400 deters and/or impedes bubbling of the decorative layer 304).

Figure 5A:
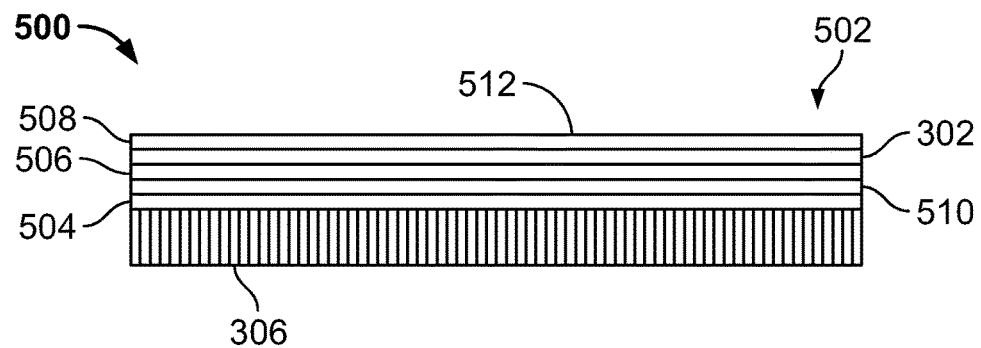
FIG. 5A is a cross-sectional view of an example barrier layer of a reinforcing layer of a portion of another example panel in accordance with the teachings herein.
Figure 5B:
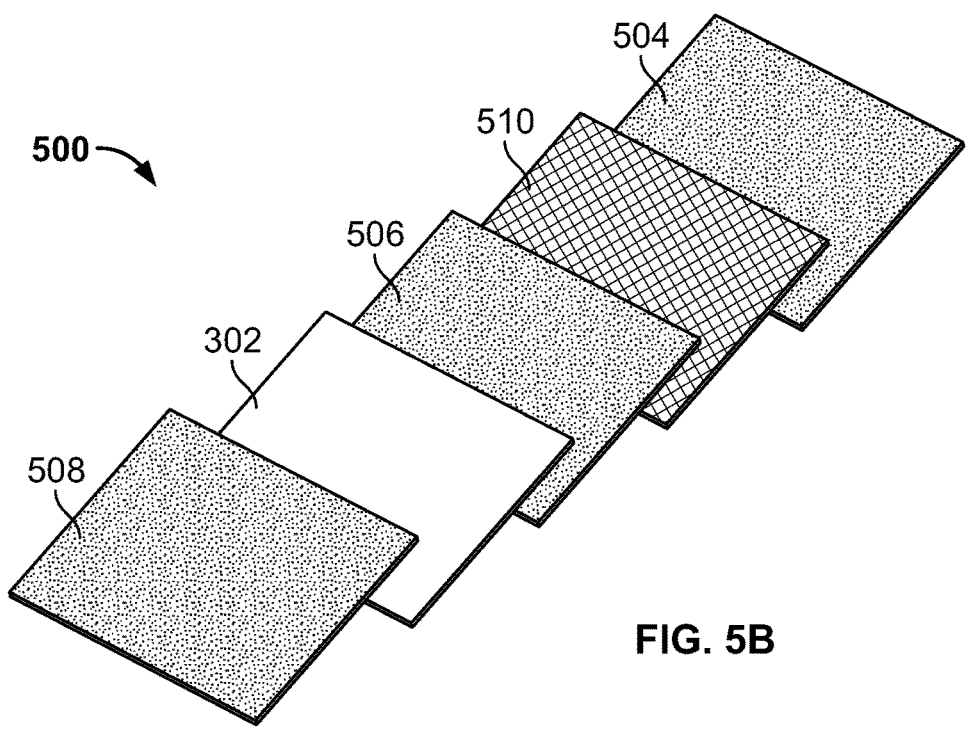
FIG. 5B is an exploded view of the example reinforcing layer of FIG. 5A.

FIGS. 5A and 5B illustrate an example reinforcing layer 500 of a portion of another example panel 502 that includes the example barrier 302 in accordance with the teachings disclosed herein. More specifically, FIG. 5A is a cross-sectional view of the panel 502, and FIG. 5B is an exploded view of the reinforcing layer 500.

The barrier layer 302 and the core layer 306 of FIGS. 5A and 5B are substantially similar or identical to those components having the same reference numbers in FIGS. 3A-3C and 4A-4B. Further, resin layers 504, 506, 508 of the reinforcing layer 500 of FIGS. 5A and 5B are substantially similar or identical to the resin layer 324 of FIG. 3C, and a fiber reinforcing layer 510 of FIGS. 5A and 5B is substantially similar or identical to the fiber reinforcing layer 322 of FIG. 3C. Because the fiber reinforcing layer 322 and the resin layer 324 are described in detail in connection with FIG. 3C, some characteristics of the resin layers 504, 506, 508 and the fiber reinforcing layer 510 of FIGS. 5A and 5B are not described in further detail below.

As illustrated in FIGS. 5A and 5B, the panel 502 includes the core layer 306 and the reinforcing layer 500 coupled to the core layer 306. While FIG. 5A shows the panel 502 having a reinforcing layer (e.g., the reinforcing layer 500) coupled to one side of the panel 502, the panel 502 includes another reinforcing layer coupled to the opposing side of the core layer 306 such that the panel 502 is a sandwich-structured composite formed by the reinforcing layer 500, the core layer 306, and the other opposing reinforcing layer. In such examples, the reinforcing layer 500 and the opposing reinforcing layer traps gas and/or vapor in the core layer 306 of the panel 502.

In the illustrated example, the reinforcing layer 500 includes the barrier layer 302, the resin layers 504, 506, 508, and the fiber reinforcing layer 510. That is, the barrier layer 302 forms part of the reinforcing layer 500 of the panel 502. For example, the fiber reinforcing layer 510 is coupled to the resin layer 504 (e.g., a first resin layer) that couples to the core layer 306 of the panel 502, and the resin layer 506 (e.g., a second resin layer) is coupled to the fiber reinforcing layer 510 that is coupled to the resin layer 504. Further, the barrier layer 302 is coupled the resin layer 506 that is coupled to the fiber reinforcing layer 510, and the resin layer 508 (e.g., a third resin layer) is coupled to the barrier layer 302 and defines a surface 512 of the reinforcing layer 500. In other examples, the barrier layer 302 is composed of, for example, thermoplastic resin (e.g., polyetherimide (PEI), polyether ether ketone (PEEK)) material that deters and/or impedes gas and/or vapor from traversing therethrough and bonds to adjacent surfaces when cured to form the reinforcing layer 500. In such examples, the reinforcing layer 500 may be formed without the resin layer 506 and/or the resin layer 508. Additionally or alternatively, the reinforcing layer 500 may include a plurality of fiber reinforcing layers (e.g., fiber reinforcing layers substantially similar or identical to the fiber reinforcing layer 510) disposed between the barrier layer 302 and the resin layer 504 to further deter and/or impede gas and/or vapor from being emitted to the decorative layer 304.

In the illustrated example, a decorative layer (e.g., the decorative layer 304 of FIGS. 3A-3B and 4A-4B) is coupled to the surface 512 of the reinforcing layer 500 and, thus, is coupled to the core layer 306 of the panel 502 via the reinforcing layer 500. In some such examples, fiber reinforcing layer(s) (e.g., fiber reinforcing layers substantially similar or identical to the fiber reinforcing layer 510) are disposed between the barrier layer 302 and the decorative layer to further deter and/or impede gas and/or vapor from being emitted to the decorative layer 304. In other examples, another reinforcing layer (e.g., a second reinforcing layer substantially similar or identical to the reinforcing layer 500) is coupled to the surface 512 of the reinforcing layer. In such examples, the decorative layer 304 is coupled to the core layer 306 of the panel 502 via the reinforcing layer 500 and the other reinforcing layer is coupled to the reinforcing layer 500.

As illustrated in the example of FIGS. 5A and 5B, the barrier layer 302 forms part of the reinforcing layer 500 that is coupled to the core layer 306 of the panel 502. As a result, the barrier layer 302 is positioned between the decorative layer 304 and the core layer 306 when the decorative layer 304 is coupled to the panel 502. Because the barrier layer 302 is composed of substantially impermeable material, the barrier layer 302 deters and/or impedes gas and/or vapor that originates in the core layer 306 (e.g., that is initially trapped in the core layer 306 between the reinforcing layer 500 and the opposing reinforcing layer of the sandwich-structured panel 502) from reaching the decorative layer 304. Thus, the barrier layer 302 of the example panel 502 deters and/or impedes the gas and/or vapor from causing a portion of the decorative layer 304 to separate from the surface 512 of the panel 502.

The example methods disclosed in FIGS. 6-9 include coupling a decorative layer to a core layer of a panel via a barrier layer. The barrier layer is composed of a substantially nonporous and/or impermeable film that deters and/or impedes gas and/or vapor from traversing through the barrier layer. Because the decorative layer is coupled to the core layer of the panel via the barrier layer, the barrier layer is disposed between the core layer and the decorative layer and, thus, deters and/or impedes gas and/or vapor emitted from the core layer from reaching the decorative layer. As a result, the barrier layer deters and/or impedes the gas and/or vapor from exerting a pressure and/or a force on a portion of the decorative layer to deter and/or impede bubbling of the decorative layer.

Figure 6:
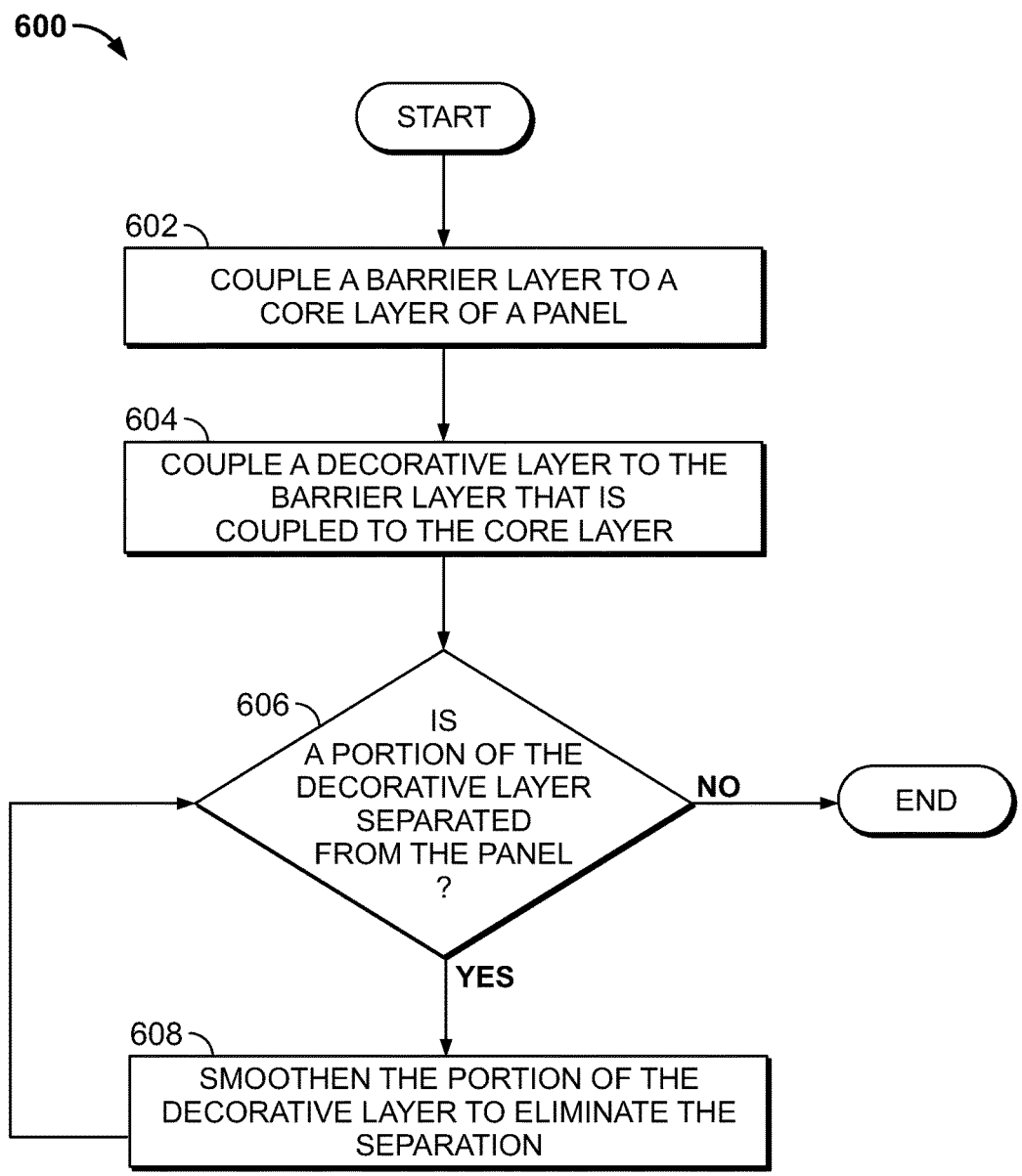
FIG. 6 is a flowchart representative of an example method to couple the example barrier layer of FIGS. 3A and 3B, the example barrier layer of FIGS. 4A and 4B and/or the example barrier layer of FIGS. 5A and 5B to a core layer of the respective panels of FIGS. 3A-3B, 4A-4B and 5A-5B in accordance with the teachings herein.

FIG. 6 is a flowchart representative of an example method 600 to couple an example barrier layer to a core layer of an example panel in accordance with the teachings herein. Although the example method 600 is described with reference to the flowchart illustrated in FIG. 6, many other methods of coupling the barrier layer to the core layer may alternatively be used. For example, the order of execution of the blocks may be changed, and/or some of the blocks described changed, eliminated, and/or combined.

The method 600 for coupling a barrier layer to a core layer is discussed in connection with the barrier layer 302 of FIGS. 3A-3B, 4A-4B and 5A-5B, the decorative layer 304 of FIGS. 3A-3B and 4A-4B, the panel 308 of FIGS. 3A-3C, the panel 400 of FIGS. 4A and 4B and/or the panel 502 of FIGS. 5A and 5B. Further, because the method 600 may refer to the barrier layer 302 of FIGS. 3A-3B, 4A-4B and 5A-5B, the decorative layer 304 of FIGS. 3A-3B and 4A-4B, the panel 308 of FIGS. 3A-3C, the panel 400 of FIGS. 4A and 4B and/or the panel 502 of FIGS. 5A and 5B, components identified in FIGS. 3A-5B having functions substantially similar or identical to the functions of components described below will not be described in detail again. Instead, the same reference numbers will be used for like structures.

The example method 600 disclosed herein starts at block 602 by coupling a barrier layer (e.g., the barrier layer 302 of FIGS. 3A-3B, 4A-4B and 5A-5B) to a core layer (e.g., the core layer 306 of FIGS. 3C, 4A-4B and 5A) of a panel (e.g., the panel 308 of FIGS. 3A-3C, the panel 400 of FIGS. 4A-4B, the panel 502 of FIG. 5A). At block 604, the example method 600 includes coupling a decorative layer (e.g., the decorative layer 304 of FIGS. 3A-3B and 4A-4B) to the barrier that is coupled to the core layer of the panel. For example, the decorative layer may be coupled to the barrier layer via an adhesive layer (e.g., the adhesive layer 312 of FIGS. 3A and 3B).

At block 606, the example method 600 includes determining whether a portion of the decorative layer is separated from the panel. For example, at block 606, the example method may determine whether bubbling has formed between the decorative layer and the panel. If a portion of the decorative layer is determined to be separated from the panel, the identified portion of the decorative layer is smoothened to eliminate the separation from the panel (block 608). Blocks 606, 608 are repeated until no portion of the decorative layer is identified as being separated from the panel.

Figure 7:
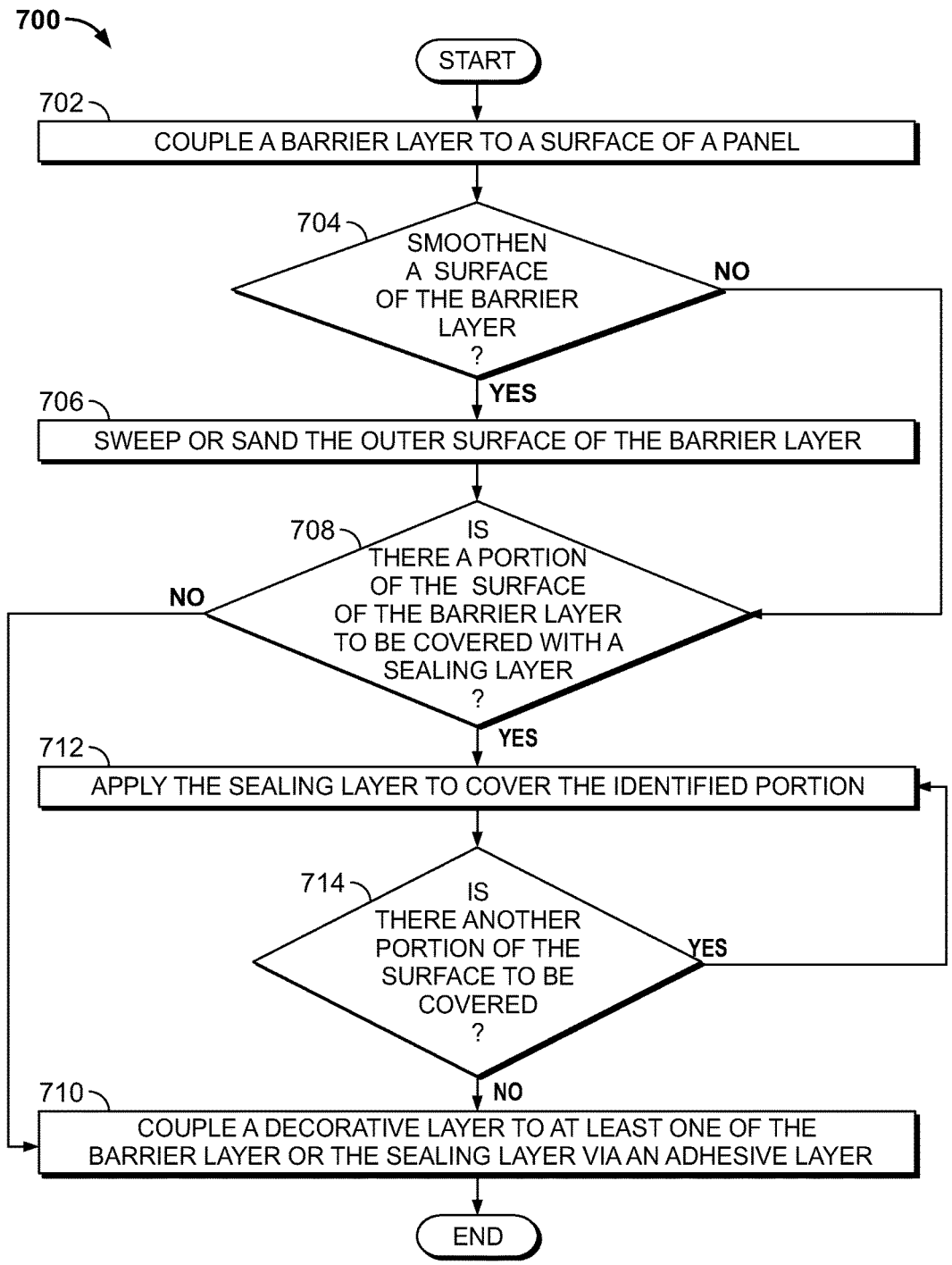
FIG. 7 is a flowchart representative of an example method to assemble the example decorative layer, the example barrier layer, and the example panel of FIGS. 3A and 3B in accordance with the teachings herein.

FIG. 7 is a flowchart representative of an example method 700 to assemble an example decorative layer, an example barrier layer, and an example panel in accordance with the teachings herein. Although the example method 700 is described with reference to the flowchart illustrated in FIG. 7, many other methods for assembling the decorative layer, the barrier layer, and the panel may alternatively be used. For example, the order of execution of the blocks may be changed, and/or some of the blocks described changed, eliminated, and/or combined.

The method 700 for assembling a decorative layer, a barrier layer, and a panel is discussed in connection with the example decorative layer 304, the barrier layer 302 and/or the panel 308 of FIGS. 3A-3C. Further, because the method 700 may refer to the decorative layer 304, the barrier layer 302 and/or the panel 308 of FIGS. 3A-3C, components identified in FIGS. 3A-3C having functions substantially similar or identical to the functions of components described below will not be described in detail again. Instead, the same reference numbers will be used for like structures.

The example method 700 disclosed herein starts at block 702 by coupling a barrier layer (e.g., the barrier layer 302 of FIGS. 3A-3B) to a surface (e.g., the surface 320 of FIGS. 3A-3C) of a panel (e.g., the panel 308 of FIGS. 3A-3C). For example, the barrier layer 302 is coupled to the surface of the panel via resin of a resin layer (e.g., the resin layer 324 of FIG. 3C) of a reinforcing layer (e.g., the reinforcing layer 314 of FIG. 3C) of the panel.

At block 704, the example method 700 includes determining whether a surface (e.g., the surface 326 of FIGS. 3A and 3B) of the barrier layer is to be smoothened. For example, the surface of the barrier layer is to be smoothened if the surface contains any imperfections that may result in separation between a decorative layer (e.g., the decorative layer 304 of FIGS. 3A and 3B) and the panel. If the surface of the barrier layer is to be smoothened, the surface is swept or sanded (block 706).

If the surface does not need to be smoothened or upon the surface being swept or sanded, the example method includes determining whether there is a portion of the surface of the barrier layer that is to be covered with a sealing layer (e.g., the sealing layer 310 of FIGS. 3A and 3B) (block 708). For example, a portion of the surface is to be covered if the surface has any aesthetic features that would undesirably affect decorative features of the decorative layer. If there is no portion of the surface of the barrier layer to be covered, the decorative layer is coupled to the barrier layer via an adhesive layer (e.g., the adhesive layer 312 of FIGS. 3A and 3B) (block 710). If there is a portion of the surface of the barrier layer that is to be covered with the sealing layer, the example method 700 includes applying the sealing layer to cover the identified portion (block 712). At block 714, the example method includes determining whether there is another portion of the layer of the barrier layer that is to be covered with the sealing layer. Blocks 712, 714 are repeated until no other portions of the surface are identified. Upon identifying no portion of the surface, the decorative layer is coupled to the barrier layer and the sealing layer via the adhesive layer (block 710).

Figure 8:
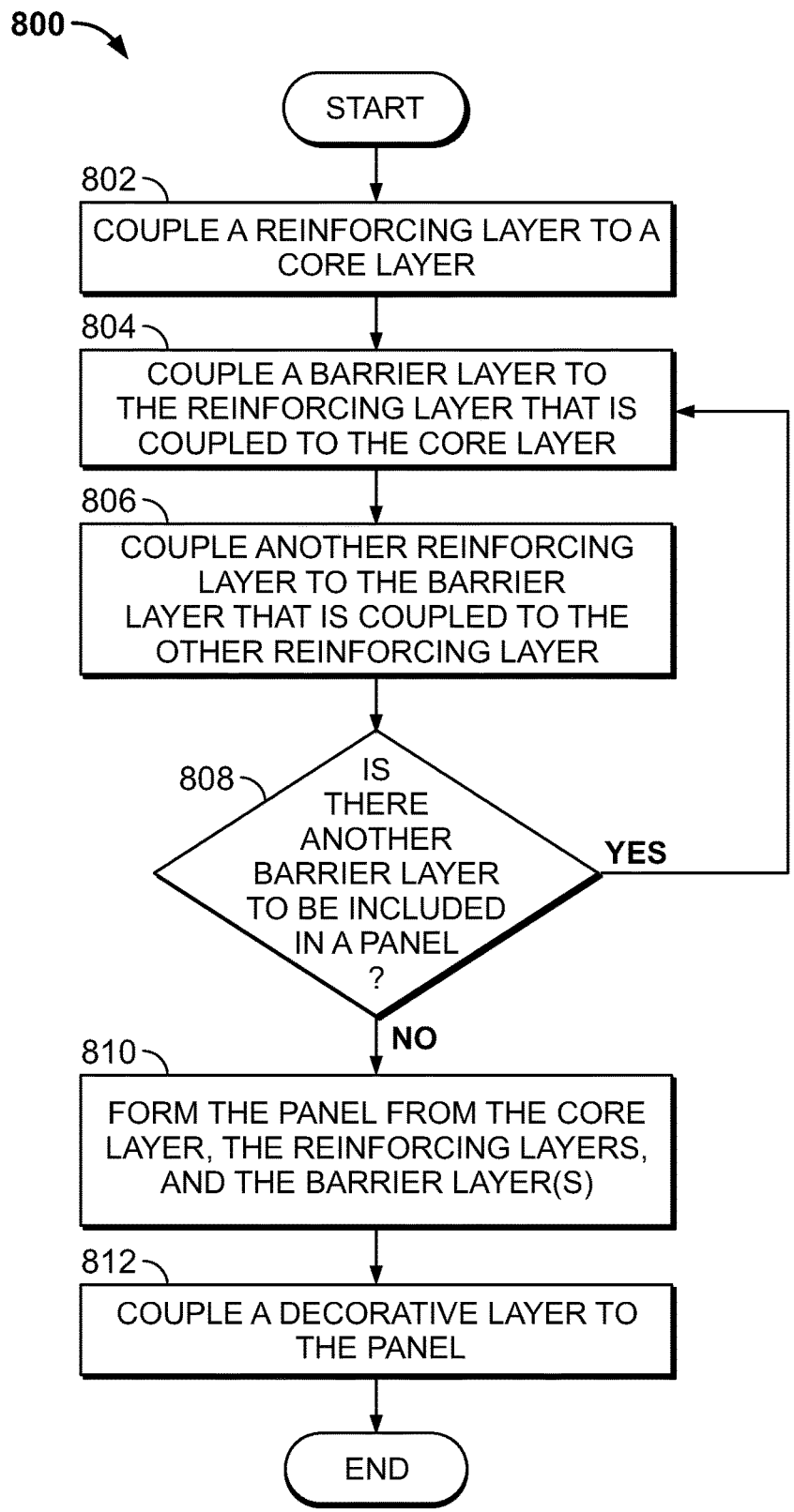
FIG. 8 is a flowchart representative of an example method to assemble the example panel having the example barrier layer of FIGS. 4A and 4B in accordance with the teachings herein.

FIG. 8 is a flowchart representative of an example method 800 to assemble an example panel having an example barrier layer and to couple an example decorative layer to the example panel in accordance with the teachings herein. Although the example method 800 is described with reference to the flowchart illustrated in FIG. 8, many other methods for assembling the panel and coupling the decorative layer to the panel may alternatively be used. For example, the order of execution of the blocks may be changed, and/or some of the blocks described changed, eliminated, and/or combined.

The method 800 for assembling a panel having a barrier layer and coupling a decorative layer to the panel is discussed in connection with the panel 400 and/or the decorative layer 304 of FIGS. 4A and 4B. Further, because the method 800 may refer to the panel 400 and/or the decorative layer 304 of FIGS. 4A and 4B, components identified in FIGS. 4A and 4B having functions substantially similar or identical to the functions of components described below will not be described in detail again. Instead, the same reference numbers will be used for like structures.

The example method 800 disclosed herein starts at block 802 by coupling a reinforcing layer (e.g., the reinforcing layer 402 of FIGS. 4A and 4B) to a core layer (e.g., the core layer 306 of FIGS. 4A and 4B). In some examples, a plurality of reinforcing layers is coupled to the core layer. At block 804, a barrier layer (e.g., the barrier layer 302 of FIGS. 4A and 4B) is coupled to the reinforcing layer that is coupled to the core layer. Further, at block 806, the example method 800 includes coupling another reinforcing layer (e.g., the reinforcing layer 404 of FIGS. 4A and 4B) to the barrier layer that is coupled to the other reinforcing layer. In some examples, a plurality of other reinforcing layers is coupled to the barrier layer. At block 808, the example method 800 includes determining whether there is another barrier layer to be included in a panel (e.g., the panel 400 of FIGS. 4A and 4B). Blocks 804, 806, 808 are repeated until no other barrier layers are to be included in the panel.

If there is no other barrier layer to be included, the example method includes forming the panel from the core layer, the reinforcing layers, and the barrier layer(s) (block 810). For example, the panel is formed by curing resin layers (e.g., the resin layer 324 of FIG. 3C) of the respective reinforcing layers to bond the core layer, the reinforcing layers, and the barrier layer(s) together. At block 812, a decorative layer (e.g., the decorative layer 304 of FIGS. 4A and 4B) is coupled to the panel, for example, via an adhesive layer (e.g., the adhesive layer 312 of FIGS. 3A and 3B).

Figure 9:
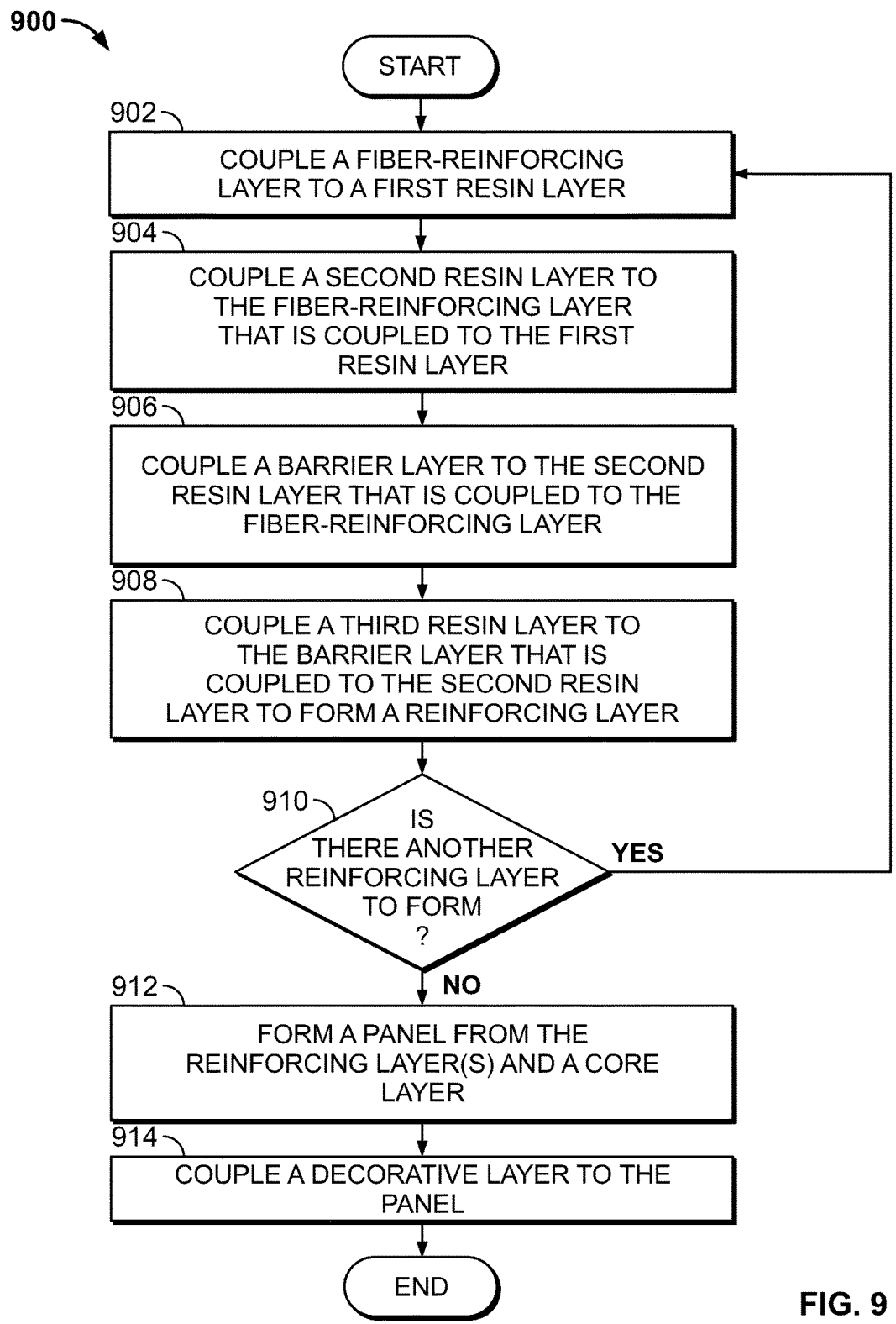
FIG. 9 is a flowchart representative of an example method to assemble the example panel having the example barrier layer of FIGS. 5A and 5B in accordance with the teachings herein.

FIG. 9 is a flowchart representative of an example method 900 to assemble another example panel having an example barrier layer and to couple an example decorative layer to the example panel in accordance with the teachings herein. Although the example method 900 is described with reference to the flowchart illustrated in FIG. 9, many other methods for assembling the panel and coupling the decorative layer to the panel may alternatively be used. For example, the order of execution of the blocks may be changed, and/or some of the blocks described changed, eliminated, and/or combined.

The method 900 for assembling a panel having a barrier layer and coupling a decorative layer to the panel is discussed in connection with the panel 502 of FIGS. 5A and 5B. Further, because the method 800 may refer to the panel 502 of FIGS. 5A and 5B, components identified in FIGS. 5A and 5B having functions substantially similar or identical to the functions of components described below will not be described in detail again. Instead, the same reference numbers will be used for like structures.

The example method 900 disclosed herein starts at block 902 by coupling a fiber reinforcing layer (e.g., the fiber reinforcing layer 510 of FIGS. 5A and 5B) to a first resin layer (e.g., the resin layer 504 of FIGS. 5A and 5B). In some examples, a plurality of fiber reinforcing layers is coupled to the first resin layer. At block 904, a second resin layer (e.g., the resin layer 506 of FIGS. 5A and 5B) is coupled to the fiber reinforcing layer that is coupled to the first resin layer. Further, at block 906, a barrier layer (e.g., the barrier layer 302 of FIGS. 5A and 5B) is coupled to the second resin layer that is coupled the fiber reinforcing layer. At block 908, a third resin layer (e.g., the resin layer 508 of FIGS. 5A and 5B) is coupled to the barrier layer that is coupled to the second resin layer to form a reinforcing layer (e.g., the reinforcing layer 500 of FIGS. 5A and 5B). That is, blocks 902, 904, 906, 908 of the example method 900 are to be performed to form the reinforcing layer.

The example method 900 including determining whether there is another reinforcing layer (e.g., a second reinforcing layer) to form (block 910). If another reinforcing layer is identified, blocks 902, 904, 906, 908, 910 are repeated until no other reinforcing layers are to be formed. Upon forming the reinforcing layer(s), the example method 900 includes forming a panel (e.g., the panel 502 of FIGS. 5A and 5B) from the reinforcing layer(s) and a core layer (e.g., the core layer 306 of FIG. 5A) (block 912). For example, the panel is formed by curing the first, second and/or third resin layers of the respective reinforcing layers to bond the layers of the reinforcing layers and the core layer together. Further, at block 914, a decorative layer (e.g., the decorative layer 304 of FIGS. 3A-3B and 4A-4B) is coupled to the panel, for example, via an adhesive layer (e.g., the adhesive layer 312 of FIGS. 3A-3B).

Although certain example methods and apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A panel assembly comprising:
    a panel including:
        a core layer;
        a first reinforcing layer coupled to the core layer; and
        a barrier layer including a polyvinyl fluoride film, the polyvinyl fluoride film having a first side directly coupled to the first reinforcing layer and a second side opposite the first side directly coupled to at least one of a second reinforcement layer, an adhesive layer, or a sealing layer, wherein the sealing layer includes at least one of a gas deposit, a liquid, a paste, or a solid layer of resin; and
    a decorative layer attached to the barrier layer via the at least one of the second reinforcement layer, the adhesive layer or the sealing layer such that the barrier layer is positioned between the core layer and the decorative layer, the barrier layer to impede at least one of gas or vapor from escaping from the core layer to the decorative layer to deter the at least one of gas or vapor from exerting a pressure on the decorative layer to prevent bubbling between the decorative layer and the panel, and wherein the panel is formed separately from the decorative layer.

2. The panel assembly of claim 1, wherein the adhesive layer is a pressure-sensitive adhesive.

3. The panel assembly of claim 1, wherein the core layer is at least one of a honeycomb layer or a foam core.

4. The panel assembly of claim 1, wherein the first reinforcing layer includes a first fiber reinforcing layer and a first resin layer.

5. The panel assembly of claim 1, wherein the panel includes an outer layer, and wherein the barrier layer is between the core layer and the outer layer.

6. The panel assembly of claim 1, wherein the second reinforcing layer includes a second fiber reinforcing layer and a second resin layer.

7. The panel assembly of claim 6, wherein at least one of the first reinforcing layer or the second reinforcing layer is a pre-impregnated layer.

8. The panel assembly of claim 1, wherein the first reinforcing layer includes:
    a first resin layer;
    a fiber reinforcing layer coupled to the first resin layer; and
    a second resin layer coupled to the fiber reinforcing layer that is coupled to the first resin layer.

9. A panel assembly comprising:
    a panel including:
        a core composed of at least one of a honeycomb core or foam;
        a first resin layer directly attached to the core;
        a fiber reinforcing layer directly attached to the first resin layer;
        a second resin layer directly attached to the fiber reinforcing layer;
        a polyvinyl fluoride barrier layer directly attached to the second resin layer; and
        a third resin layer directly attached to the polyvinyl fluoride barrier layer; and
    a decorative layer directly attached to the panel via a pressure-sensitive adhesive such that the polyvinyl fluoride barrier layer is positioned between the core and the pressure-sensitive adhesive, the polyvinyl fluoride barrier layer to impede at least one of gas or vapor from escaping from the core to the pressure-sensitive adhesive to deter the at least one of gas or vapor from exerting a pressure on the pressure-sensitive adhesive and the decorative layer to prevent the decorative layer from bubbling and separating from the panel.

10. A method comprising:
    forming a panel including:
        obtaining a core layer;
        coupling a first reinforcing layer to the core layer;
        coupling a first side of a barrier layer directly to the first reinforcing layer, the barrier layer being a polyvinyl fluoride film;
        coupling a second side of the barrier layer opposite the first side directly to at least one of a second reinforcement layer, an adhesive layer, or a sealing layer, wherein the sealing layer includes at least one of a gas deposit, a liquid, a paste, or a solid layer of resin; and
    coupling a decorative layer to the barrier layer via the at least of the second reinforcement layer, the adhesive layer, or the sealing layer such that the barrier layer is positioned between the decorative layer and the core layer, the barrier layer to impede at least one of gas or vapor from escaping from the core layer to the decorative layer to deter the at least one of gas or vapor from exerting a pressure on the decorative layer to deter bubbling between the decorative layer and the panel, the panel being formed as separate structure from the decorative layer.

11. The method of claim 10, further including sweeping or sanding a second surface of the barrier layer opposite the first surface to smoothen the second surface of the barrier layer.

12. The method of claim 10, wherein the first reinforcing layer includes a fiber reinforcing layer.

13. The method of claim 10, wherein forming the first reinforcing layer includes:
    coupling a fiber reinforcing layer to a first resin layer;
    coupling a second resin layer to the fiber reinforcing layer that is coupled to the first resin layer; and
    coupling the barrier layer to the second resin layer that is coupled to the fiber reinforcing layer.

* * * * *